United States Patent [19]

Higgins

[11] Patent Number: 4,618,450

[45] Date of Patent: Oct. 21, 1986

[54] AQUEOUS SYSTEMS CONTAINING AMINO SULFONIC ACID DERIVATIVES OF CARBOXYLIC ACIDS

[75] Inventor: William A. Higgins, Gates Mills, Ohio

[73] Assignee: The Lubrizol Corporation, Wickliffe, Ohio

[21] Appl. No.: 669,173

[22] Filed: Nov. 7, 1984

[51] Int. Cl.$^4$ .................. B01F 17/24; B01J 13/00
[52] U.S. Cl. .................. 252/355; 252/75; 252/78.1; 252/315.1; 252/354
[58] Field of Search .............. 252/75, 78.1, 355, 545, 252/354, 315.1; 564/144; 548/547

[56] References Cited

U.S. PATENT DOCUMENTS

| | | | |
|---|---|---|---|
| 2,189,803 | 2/1940 | Katzman et al. | 252/355 X |
| 2,568,876 | 9/1951 | White et al. | 106/14 |
| 2,694,087 | 11/1954 | Petrie et al. | 260/512 |
| 2,798,852 | 7/1957 | Wiese et al. | 252/42.7 |
| 3,029,250 | 4/1962 | Gaertner | 548/547 |
| 3,047,509 | 7/1962 | Alsbury et al. | 252/545 X |
| 3,255,108 | 6/1966 | Wiese | 252/32.7 |
| 3,269,946 | 8/1966 | Wiese | 252/32.5 |
| 3,296,137 | 1/1967 | Wiese | 252/48.2 |
| 3,351,647 | 11/1967 | Butler et al. | 260/429.9 |
| 3,361,668 | 1/1968 | Wiese | 252/32.7 |
| 3,396,109 | 8/1968 | Butler et al. | 252/32.7 |
| 3,402,188 | 9/1968 | Wiese | 260/429 |
| 3,446,735 | 5/1969 | Wiese | 252/32.7 |
| 3,573,293 | 3/1971 | Wiese | 260/242 |
| 3,624,115 | 3/1970 | Otto et al. | 260/429.9 |
| 3,630,902 | 12/1971 | Coupland et al. | 252/51.5 A |
| 3,649,543 | 3/1972 | Cahn et al. | 252/355 X |
| 3,793,226 | 2/1974 | Danzik | 252/545 X |
| 3,870,671 | 3/1975 | Aignesberger et al. | 260/29.4 R |
| 3,912,641 | 10/1975 | Wiese et al. | 252/47.5 |
| 3,926,820 | 12/1975 | Dickert, Jr. et al. | 252/33 |
| 3,932,288 | 1/1976 | Hoke | 252/392 X |
| 3,991,079 | 11/1976 | Hoke | 549/90 |
| 4,016,150 | 4/1977 | Wiese et al. | 260/128 |
| 4,053,425 | 10/1977 | Heiba et al. | 252/75 X |
| 4,185,485 | 1/1980 | Schick et al. | 72/42 |
| 4,564,371 | 1/1986 | Ueda et al. | 252/355 X |

*Primary Examiner*—Richard D. Lovering
*Attorney, Agent, or Firm*—Karl Bozicevic; Walter C. Danison, Jr.; Denis A. Polyn

[57] ABSTRACT

Aqueous systems also are described which comprise at least about 40% of water and an N-acrylated amino hydrocarbyl sulfonic acid or salt composition characterized by the presence within the structure of an imido group or at least one acyl acyloxy or acylimidoyl group attached to the amino nitrogen, said groups being derived from the carboxylic acid groups contained in (a) maleic acid or anhydride, or
(b) a hydrocarbyl-substituted polycarboxylic acid or anhydride.

The amino hydrocarbyl sulfonic acid or salt compositions are useful as emulsifiers, thickeners, dispersants, etc. in the aqueous systems.

8 Claims, No Drawings

AQUEOUS SYSTEMS CONTAINING AMINO SULFONIC ACID DERIVATIVES OF CARBOXYLIC ACIDS

BACKGROUND OF THE INVENTION

This invention relates to N-acylated amino hydrocarbyl sulfonic acid and acid derivative compositions. Such compositions are useful in aqueous systems particularly as emulsifiers, surface active agents and thickeners.

Derivatives of some N-acylated amino hydrocarbyl sulfonic acids have been described in the prior art. For example, U.S. Pat. No. 3,926,820 describes salts of alkyl or alkenyl succinimido aryl sulfonic acids having from about 14 to about 30 carbon atoms in the alkyl or alkenyl group. Such compounds are reported to be useful as thickeners in the preparation of greases. Products prepared by the reaction of maleic anhydride or substituted succinic anhydride with amino alkyl sulfonic acids are described in U.S. Pat. Nos. 3,991,079 and 3,932,288. Similar products are also described in British Patent Specifications Nos. 1,377,077 and 1,377,948. Such products are described in these patents as being useful as additives for lubricants and fuel compositions. U.S. Pat. No. 3,188,307 describes alkenyl-N-sulfo-oxyhydrocarbon-imides which are reported to have detergent, wetting and surface active properties in aqueous systems. Such compounds are derived from alkenyl-substituted anhydrides and sulfated alkanol amines.

SUMMARY OF THE INVENTION

The present invention relates to aqueous systems comprising at least 40% water and an N-acylated hydrocarbyl sulfonic acid or salt composition characterized by the presence within the structure of an imido group or an acyl, acylimidoyl or acyloxy group attached directly to the amino nitrogen, said groups being derived from at least one of the carboxylic acid groups contained in
(a) maleic acid or maleic anhydride, or
(b) a hydrocarbyl-substituted dicarboxylic acid or anhydride.

When aqueous systems are prepared containing the sulfonic acid or salt compositions described above, these compositions function as emulsifiers, dispersing agents and thickeners.

DESCRIPTION OF THE PREFERRED EMBODIMENTS

The aqueous systems of the present invention comprise at least 40% of water and an N-acylated hydrocarbyl sulfonic acid or salt composition characterized by the presence within its structure of an imido group or acyl, acylimidoyl, or acyloxy group attached directly to the amino nitrogen, all of said groups being derived from the carboxylic acid groups contained in a
(a) maleic acid or maleic anhydride, or
(b) a hydrocarbyl-substituted polycarboxylic acid or anhydride.

Preferably, the sulfonic acid or salt compositions of the invention contain an imido group.

The compositions of the present invention are prepared by reacting the above described polycarboxylic acids or polycarboxylic acid anhydrides (or reactor derivatives of) with at least one amino hydrocarbyl sulfonic acid of the formula

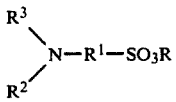

wherein R is hydrogen, a cation or an alkyl or substituted alkyl group, $R^1$ is a hydrocarbyl group of from 1 to about 30 carbon atoms, $R^2$ and $R^3$ are independently hydrogen atoms or a monovalent hydrocarbyl or substituted hydrocarbyl group containing from 1 to about 18 carbon atoms with the proviso that at least one of $R^2$ or $R^3$ is hydrogen. It will be apparent from the above description that the amino hydrocarbyl sulfonic acids used in this invention are characterized by the presence of a primary amine group ($-NH_2$) or a secondary amine group ($>NH$).

When the term "hydrocarbyl" is used in describing a substituent in this specification and the appended claims, it is intended to embrace substantially hydrocarbyl groups unless expressly stated to the contrary. "Substantially hydrocarbyl groups" are those hydrocarbyl groups which are substituted with non-hydrocarbyl substituents (such as those enumerated below) which do not significantly affect the hydrocarbyl character and nature of the group in the context of this invention. Such groups will be considered equivalent to hydrocarbyl groups by those skilled in the art to which this invention pertains.

Non-limiting examples of substituents that do not significantly alter the hydrocarbyl nature of the hydrocarbyl groups of this invention are the following:
pendant ether groups (especially hydrocarbyloxy and particularly alkoxy groups of up to ten carbon atoms)
Oxa linkages (e.g., $-O-$ linkages in a hydrocarbyl chain)
nitro
cyano
fluoro
pendant thioether groups (especially $C_{1-10}$ alkyl thioethers such as methyl mercapto, butylmercapto, etc.)
thia linkages (e.g., $-S-$ linkages in the main hydrocarbyl chain)
pendant sulfonyl groups ($-SO_2$) and sulfonyl linkages in the main chain
pendant sulfinyl groups ($-SO-$) and sulfinyl linkages in the main chain.

Other such non-hydrocarbyl groups will be apparent to those skilled in the art.

When such non-hydrocarbyl substituents are present in the hydrocarbyl substituents of the present invention there will generally be no more than two such substituents for every 10 carbon atoms in each hydrocarbyl group and, preferably, no more than 1 for each 10 carbon atoms. Ordinarily, however, no such substituents will be present and the hydrocarbyl groups of the present invention be purely hydrocarbyl without non-hydrocarbyl substituents.

The group $R^1$ in Formula I can be aliphatic, alicyclic or aromatic in nature. Preferably $R^1$ is an aromatic or aliphatic hydrocarbyl group of about 2 to about 18 carbon atoms. For example, $R^1$ can be aromatic in nature such as a phenylene, methyl phenylene or biphenylene unit or aliphatic in nature such as methylene, propylene, trimethylene, ethylene, octamethylene, etc.

It can also be alicyclic in nature such as cyclopentyl, cyclohexyl, methyl cyclohexyl, etc. Other groups which can be represented by $R^1$ in Formula I include the following:

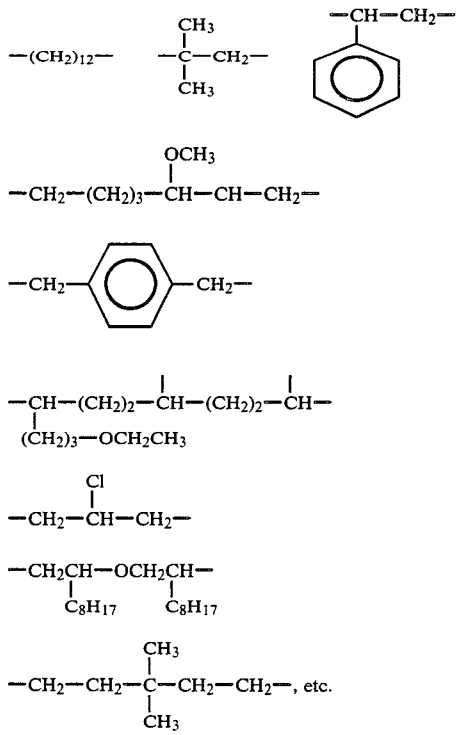

In a preferred embodiment, the amino sulfonic acids are characterized by the formula

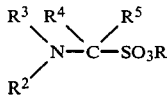

(II)

wherein R, $R^2$ and $R^3$ are as defined with respect to Formula I, and $R^4$ and $R^5$ are each independently hydrogen, alkyl groups or aromatic groups. Generally, $R^4$ is hydrogen, an alkyl group or an aromatic group, and $R^5$ is hydrogen.

As mentioned above, $R^2$ and $R^3$ are each independently hydrogen, or a monovalent hydrocarbyl or substantially hydrocarbyl group of about 1 to about 18 carbon atoms. Examples of suitable hydrocarbyl groups include alkyl groups, cycloalkyl groups, aryl groups, aralkyl groups, alkaryl, alkenyl, cycloalkenyl groups, etc. Generally, the hydrocarbyl groups will not contain more than 12 carbon atoms each. The hydrocarbyl groups also may be substantially hydrocarbyl in nature and contain one or more substituents such as halo, or alkoxy, lower alkyl mercapto, nitro, etc. Generally, however, each of $R^2$ or $R^3$ when it is other than hydrogen is an alkyl, phenyl or lower alkyl-substituted phenyl group of about 1 to 12 carbon atoms. Specific examples of the $(R^2)(R^3)N—$ group of Formulae I and II are amino (i.e., $—NH_2$), methylamino, ethylamino, octylamino, decylamino, cyclohexylamino, N-ethylcyclopentylamino, 3-chlorocyclohexylamino, aminoethylamino, beta-chloroethylamino, beta-ethoxypropylamino, isopropylamino, anilino, paranitroanilino, ortho, meta- or para-anisidino, diphenylamino, allylamino, 2,4,5-trimethylanilino, etc.

The amino sulfonic acids of the type represented by Formula II are prepared by methods well known in the art. One method of synthesizing such compounds utilizes the reaction of an aldehyde or ketone with an alkali metal bisulfite followed by reaction with ammonia, ammonium hydroxide, or a primary or secondary amine which may be an aliphatic or aromatic amine. Generally, equimolar amounts of aldehyde or ketone and bisulfite are stirred together in water forming an aldehyde-bisulfite in situ, followed by the addition of equimolar amounts of amine. When an aldehyde is utilized in the reaction, then either $R^4$ or $R^5$ in Formula III is hydrogen. When ketones are utilized, neither $R^4$ or $R^5$ can be hydrogen.

Examples of aldehydes which can be utilized in the preparation of the amino sulfonic acids of Formula III include formaldehyde, acetaldehyde, propionaldehyde, benzaldehyde, parachlorobenzaldehyde, phenylacetaldehyde, phenylpropionaldehyde, etc. Examples of ketones include acetone, methylethylketone, diethylketone, benzophenone, etc. The amines which can be utilized in the preparation of the amino sulfonic acids are exemplified by methylamine, ethylamine, propylamine, butylamine, pentylamine, octylamine, decylamine, cyclohexylamine, aniline, paranitroaniline, parachloroaniline, etc.

In another embodiment, the amino sulfonic acids are aliphatic acids of the formula:

(III)

wherein $R_6$, $R_7$, $R_8$, and $R_9$ are each independently selected from the group consisting of hydrogen atoms and $C_1$ and $C_{18}$, more preferably $C_1$ to $C_{12}$, hydrocarbyl groups. In an especially preferred aspect of the invention, $R_6$, $R_7$, $R_8$, and $R_9$ are each independently hydrogen or lower alkyl (that is, alkyl of up to 7 carbon atoms) with the proviso that at least one is other than hydrogen. A useful method for preparing such 2-amino alkane sulfonic acids is by hydrolysis of the corresponding 2-amido alkane sulfonic acids. These amido compounds are conveniently prepared by reaction of a nitrile with an olefin in the presence of concentrated sulfuric acid. For further details, see U.S. Pat. Nos. 3,544,597 and 3,506,707; Canadian Patent No. 704,778 and British Patent No. 1,090,779 which are hereby incorporated by reference for their relevant disclosures in this regard.

As mentioned above, the R group in Formulae I and II is hydrogen, a cation, or an alkyl or substituted alkyl group. The cations preferably are cations of metals such as alkali or alkaline earth metals, ammonia, or amines.

Preferably, when M is a metal, it will be a cation of a Group I or II metal although it can represent other metals such as iron, nickel, or zinc. The Group II metal cations constitute a preferred class with calcium and barium being particularly preferred. When R is an amine cation, the identity of the amine is not particularly critical and any amine capable of forming an amine salt with sulfonic acid is contemplated. Generally amines containing from 1 to about 8 carbon atoms are preferred. It will be obvious to those skilled in the art that when the cation is polyvalent, the normal salts will comprise one equivalent of acid for each equivalent of metal.

When R is an alkyl or substituted alkyl group, R can be derived from a mono- or polyhydric alcohol or a hydroxy-substituted aromatic hydrocarbon containing up to 40 aliphatic carbon atoms. Thus, the R group can be derived from a mono- or polyhydric alkanol, mono- or polyhydric phenol, mono- or polyhydric cyclic alkanol, or mono- or polyhydric naphthol. Typical alcohols and hydroxy-substituted aromatic compounds useful for preparing the esters are the mono- and polyhydric lower alkanols such as methanol, ethanol, isopropanol, butanol, glycerol, mannitol, pentaerythritol, sorbitol, etc; alkylene glycols and polyalkylene glycols where the alkylene groups contain up to 8 carbon atoms and the corresponding monoalkyl and monoaryl ethers such as ethylene glycol, propylene glycol, trimethylene glycol, hexamethylene glycol, diethylene glycol, triethylene glycol, monoethyl ether of diethylene glycol and monophenyl ether of triethylene glycol; cycloalkanols, such as cyclohexanol, cyclopentanol, 4-methoxy-cyclohexanol, 1,3-dihydroxycyclopentane, 4-(beta-hydroxyethyl)-cyclohexanol, etc; amino alcohols, such as tri-(beta-hydroxyethyl)amine, di-(beta-hydroxy-propyl)amine, 3-(N,N-diethylamino)propanol, etc.; phenol, p-aminophenol, p-hydroxyethyl phenol, 1,3-di-(hydroxy)-phenol, p-phenyl-phenol, 1,2-di-(hydroxy)-naphthaline and phenylethanol. Ordinarily, the ester group will be derived from a mono- or polyhydric lower alkanol, phenol, or alkyl-substituted phenol containing one to three alkyl groups.

Hydroxy-substituted alkyl groups also can be introduced as the R group by reaction of an amino sulfonic acid with an alkylene oxide. Examples of useful oxides include ethylene oxide, propylene oxide, etc. The amount of alkylene oxide reacted with the sulfonic acid may be an excess thereby resulting in hydroxy alkyl groups of increasing molecular weight.

As mentioned above, the present invention contemplates the preparation of hydrocarbyl sulfonic acid or salt compositions which are characterized by the presence within their structure of an imido group or an acyl, acylimidoyl or acyloxy group attached to an amino nitrogen, said groups being derived from a carboxylic acid contained in
 (a) maleic acid or maleic anhydride, or
 (b) a hydrocarbyl-substituted polycarboxylic acid or anhydride.

These compositions are prepared by reacting the abovedescribed amino hydrocarbyl sulfonic acids or functional derivatives thereof with the acids or anhydrides (a) and (b) described above.

The hydrocarbyl-substituted polycarboxylic acid or anhydrides useful in preparing the compositions of the invention include such compounds wherein the hydrocarbyl substituent is a substantially saturated hydrocarbyl substituent of at least about 6 carbon atoms. It should be noted as stated earlier that whenever the term "hydrocarbyl" is used in describing a substituent in this specification and in the appended claims, it is intended to embrace substantially hydrocarbyl groups unless expressly stated to the contrary. "Substantially hydrocarbyl groups" are those hydrocarbyl groups which are substituted with non-hydrocarbyl substituents (such as those enumerated below) which do not significantly affect the hydrocarbyl character and nature of the group in the context of this invention. Such groups will be considered equivalent to hydrocarbyl groups by those skilled in the art to which this invention pertains.

When such non-hydrocarbyl substituents are present in the hydrocarbyl substituents of the present invention there will generally be no more than two such substituents for every 10 carbon atoms in each hydrocarbyl group and, preferably, no more than 1 for each 10 carbon atoms. Ordinarily, however, no such substituents will be present and the hydrocarbyl groups of the present invention be purely hydrocarbyl without non-hydrocarbyl substituents.

The polycarboxylic acid groups are normally derived from polycarboxylic acids or analogous carboxylic acid-producing compounds. Such polycarboxylic acid-producing compounds are well known to those of skill in the art as compounds which produce polycarboxylic acid moieties under the conditions of their reaction. Thus, it is well known that compounds such as anhydrides, esters, salts, amides, acyl halides, (especially acyl chlorides), etc., can often be used in place of free carboxylic acids to introduce carboxylic acid groups into certain products such as the acylated amino hydrocarbyl sulfonic acids of the present invention. For purposes of this invention, the carboxylic acid-producing compounds used in lieu of the acid per se normally will be the anhydrides or the lower alkyl esters (e.g., where the alkyl group contains 1 to 7 carbon atoms and usually 2 to 4 carbon atoms).

The preferred polycarboxylic acids used herein are relatively high molecular weight hydrocarbyl substituted carboxylic acids. These are well-known in the art and have been described in detail, for example, in U.S. Pat. Nos. 3,087,936; 3,163,603; 3,172,892; 3,189,544; 3,219,666; 3,272,746; 3,288,714; 3,306,907; 3,331,776; 3,340,281; and 3,346,354. In the interest of brevity, these patents are incorporated herein for their disclosure of suitable polycarboxylic acids which can be used to introduce a carboxylic acid group into acylated amino sulfonic acids of the present invention as well as for their disclosure of suitable acylation techniques for accomplishing this introduction.

As disclosed in the foregoing patents, there are several processes for preparing such polycarboxylic acids. Generally, the process involves the reaction of (1) an ethylenically unsaturated dicarboxylic acid, acid halide, or anhydride (i.e., a carboxylic acid reactant) of up to 20 carbon atoms with (2) an ethylenically unsaturated hydrocarbon containing at least about 6 aliphatic carbon atoms or a chlorinated hydrocarbon containing at least about 6 aliphatic carbon atoms at a temperature within the range of about 100°–300° C. More preferably these unsaturated or chlorinated hydrocarbons have at least 30 aliphatic carbon atoms. The chlorinated hydrocarbon or ethylenically unsaturated hydrocarbon reactant can contain non-hydrocarbyl, polar substituents (as described above) 1, oil-solubilizing pendant groups, and unsaturation within the general limitations set forth hereinabove.

When preparing the polycarboxylic acids according to one of these two processes, the ethylenicaly unsaturated polycarboxylic acid reactant usually corresponds to the formula

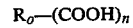

with $R_o$ having up to 10 carbon atoms (preferably from 2 to about 6 carbon atoms) and being characterized by the presence of at least one ethylenically unsaturated carbon-to-carbon covalent bond and n being an integer from 2 to 6 and preferably 2. The acidic reactant can also be the corresponding carboxylic acid halide, anhydride, ester, or other equivalent acylating agent and mixtures of one or more of these. Ordinarily, the total number of carbon atoms in the acidic reactant will not exceed 10 and generally will not exceed 6. Preferably the acidic reactant will have at least one ethylenic linkage in an alpha, beta-position with respect to at least one carboxyl function. Exemplary acidic reactants are maleic acid, maleic anhydride, fumaric acid, itaconic acid, itaconic anhydride, citraconic acid, citraconic anhydride, mesaconic acid, glutaconic acid, chloromaleic acid, aconitic acid, crotonic acid, methylcrotonic acid, sorbic acid, 3-hexenoic acid, 10-decnoic acid, and the like. Due to considerations of economy and availability, these acid reactants usually employed are maleic acid and maleic anhydride.

As is apparent from the foregoing discussion, the polycarboxylic acid used to provide the polycarboxylic acid group may contain cyclic and/or aromatic groups. However, the acids are essentially aliphatic in nature and, in most instances, the preferred acid acylating agents are aliphatic polycarboxylic (usually dicarboxylic) acids, anhydrides, halides and lower alkyl esters.

The substantially saturated aliphatic hydrocarbon-substituted succinic acid and anhydrides are especially preferred as acylating agents in the preparation of the acylated nitrogen compounds of the present invention. These succinic acid acylating agents are readily prepared by reacting maleic anhydride with a high molecular weight olefin or a chlorinated high molecular weight hydrocarbon. The reaction involves merely heating the two reactants at a temperature of about 100°–300° C., preferably, about 100°–200° C. The product from such a reaction is a substituted succinic anhydride where the substituent is derived from the olefin or chlorinated hydrocarbon as described in the above-cited patents. The product may be hydrogenated to remove all or a portion of any ethylenically unsaturated covalent linkages by standard hydrogenation procedures, if desired. The substituted succinic anhydrides may be hydrolyzed by treatment with water or steam to the corresponding acid and either the anhydride or the acid may be converted to the corresponding acid halide or ester by reacting with phosphorus halide, phenols, or alcohols.

The ethylenically unsaturated hydrocarbon reactant and the chlorinated hydrocarbon reactant used in the preparation of the acylating agents are principally the high molecular weight, substantially saturated petroleum fractions and substantially saturated olefin polymers and the corresponding chlorinated products. The polymers and chlorinated polymers derived from mono-olefins having from 2 to about 30 carbon atoms are preferred. Those derived from $C_{2-6}$ 1-mono-olefins are especially preferred. Thus, exemplary of useful polymers are the polymers of 1-mono-olefins such as ethylene, propene, 1-butene, isobutene, 1-hexene, 1-octene, 2-methyl-1-heptene, 3-cyclohexyl-1-butene, and 2-methyl-5-propyl-1-hexene. Polymers of medial olefins, i.e., olefins in which the olefinic linkage is not at the terminal position, likewise are useful. These are exemplified by 2-butene, 3-pentene, and 4-octene.

The interpolymers of 1-mono-olefins such as illustrated above with each other and with other interpolymerizable olefinic substances such as aromatic olefins, cyclic olefins, and polyolefins, are also useful sources of the ethylenically unsaturated reactant. Such interpolymers include for example, those prepared by polymerizing isobutene with styrene, isobutene with butadiene, propene with isoprene, propene with isobutene, ethylene with piperylene, isobutene with chloroprene, isobutene with p-methyl styrene, 1-hexene with 1,3-hexadiene, 1-octene with 1-hexene, 1-heptene with 1-pentene, 3-methyl-1-butene with 1-octene, 3,3-dimethyl-1-pentene with 1-hexene, isobutene with styrene and piperylene, etc.

The chlorinated hydrocarbons and ethylenically unsaturated hydrocarbons used in the preparation of the acylating agents can have number average molecular weights of about 400 to about 5000 as determined by vapor pressure osmometry.

In lieu of the high molecular weight hydrocarbons and chlorinated hydrocarbons discussed above, hydrocarbons containing activating polar substituents which are capable of activating the hydrocarbon molecule in respect to reaction with an ethylenically unsaturated acid reactant may be used in the above-illustrated reactions for preparing the acylating agents. Such polar substituents include sulfide and disulfide linkages, and nitro, mercapto, bromo, carbonyl, and formyl radicals. Examples of these polar-substituted hydrocarbons include polypropene sulfide, dipolyisobutene disulfide, nitrated mineral oil, di-polyethylene sulfide, brominated polyethylene, etc.

The acylating agents may also be prepared by halogenating a high molecular weight hydrocarbon such as the above-described olefin polymers to produce a polyhalogenated product, converting the polyhalogenated product of a polynitrile, and then hydrolyzing the polynitrile. They may be prepared by oxidation of high molecular weight polyhydric alcohol with potassium permanganate, nitric acid, or a similar oxidizing agent. Another method for preparing such polycarboxylic acids involves the reaction of an olefin or a polar-substituted hydrocarbon such as a chloropolyisobutene with an unsaturated polycarboxylic acid such as 2-pentene-1,3,5-tricarboxylic acid prepared by dehydration of citric acid.

Polycarboxylic acid acylating agents can also be obtained by reacting chlorinated polycarboxylic acids, anhydrides, acyl halides, and the like with ethylenically unsaturated hydrocarbons or ethylenically unsaturated substituted hydrocarbons such as the polyolefins and substituted polyolefins described hereinabove.

The polycarboxylic acid anhydrides are obtained by dehydrating the corresponding acids. Dehydration is readily accomplished by heating the acid to a temperature above about 70° C., preferably in the presence of a dehydration agent, e.g., acetic anhydride. Cyclic anhydrides are usually obtained from polycarboxylic acids having acid groups separated by no more than 3 carbon atoms such as substituted succinic or glutaric acid, whereas linear anhydrides are obtained from polycarboxylic acids having the acid radicals separated by 4 or more carbon atoms.

The acid halides of the polycarboxylic acids can be prepared by the reaction of the acids or their anhydrides with a halogenating agent such as phosphorus tribromide, phosphorus pentachloride, or thionyl chloride. The esters of such acids can be prepared simply by the reaction of the acid or their anhydrides with an alcohol or a phenolic compound such as methanol, ethanol, propanol, cyclohexanol, phenol, and the like. The esterification is usually promoted by the use of an alkaline catalyst such as sodium hydroxide or sodium alkoxide or an acidic catalyst such as sulfuric acid.

A convenient technique for preparing the N-acylated amino hydrocarbyl sulfonic acid or acid derivative compositions of the invention comprises reacting at least one carboxylic acid source comprising
(a) maleic acid or maleic anhydride, or
(b) a hydrocarbyl-substituted polycarboxylic acid or anhydride, with at least one amino sulfonic acid or functional derivative thereof such as a salt, ester, amide, halide, etc. (e.g., Formulae I, II and III). In such a reaction, the carboxylic acylating group —C(O)X of the carboxylic acid source wherein X is selected from the group consisting of halogen, hydroxy, hydrocarbyloxy and acyloxy groups reacts directly with the HN< or the $H_2N-$ group of the amino sulfonic acid (i.e., Formula I) to form an acyl, acylimidoyl, acyloxy or imido group which links the carboxylic acid group directly to the sulfonic acid portion. The precise nature of the linkage is unimportant and generally, is believed that the linkage will be a mixture of the above-named linkages although it appears that in most instances, where polycarboxylic acids are utilized, and the nitrogen of the amino group contains two hydrogens, the imido group predominates. In some instances, the product appears to contain essentially all imido linkages. The proportions of the various types of linkages in the products obtained in accordance with the invention will depend in part on the particular carboxylic acid acylating reagent, the amino sulfonic acid involved, and the reaction temperature conditions such as reaction proportions, temperature, ratio of reactants, etc.

Usually this process is carried out by heating a mixture of at least one carboxylic acid or acid-producing acylating agent (preferably a polycarboxylic acid) and at least one amino sulfonic acid at a temperature above about 80° C. The maximum reaction temperature is the decomposition temperature of a reactant of product present in the mixture having the lowest decomposition temperature. Preferably the reaction temperature is within the range of about 100° to about 250° C. However, when a carboxylic acid or acid halide or anhydride is employed, the process can be carried out at lower temperatures such as about 30° C. to obtain products having predominantly salt or salt-amide linkages. Further heating of such salts or salt amides will produce products having predominantly amide, imide, or acylimidoyl linkages by heating them to 80° C. or higher. The use of solvents such as natural or synthetic lubricating oils, aromatic, aliphatic or alicyclic hydrocarbons and halogenated derivatives of such hydrocarbons as diluents is often desirable to facilitate temperature control and further processing such as filtration.

The relative proportions of the polycarboxylic acid acylating agent and the amino hydrocarbyl sulfonic acid compound used are such that at least one half of the stoichiometrically equivalent amount of the amino acid is used for each equivalent of acylating agent. In this regard, it should be noted that in the equivalent weight of the amino sulfonic acid compound is based on the number of non-acylated amino groups of the general formula HN< and $H_2N-$ which it contains. Similarly the equivalent weight of the acylating agent is based on the number of acid or acid producing groups present. Thus, 2-amino-ethane sulfonic acid has one equivalent per mole. N-(2-aminoethyl) sulfanilic acid has two equivalents per mole. A substituted succinic acid anhydride or ester has two equivalents per mole and so forth. The upper limit of the useful amount of amino sulfonic acid compound appears to be four equivalents for each equivalent of carboxylic acid acylating agent. In most instances, the preferred amount of amino sulfonic acid compound is about one to about two equivalents of sulfonic acid compound for each equivalent of carboxylic acid acylating reagent.

In some instances it is desirable to react the product obtained from the reaction of an amino sulfonic acid and the carboxylic acid-containing interpolymer with a mono- or polyhydric compound, an amino or amino alcohol compound, or mixtures thereof to whereby any carboxy groups in the interpolymer which did not react with the amino sulfonic esters will react with the hydroxy or amino groups to form esters and amides respectively. Examples of mono- and polyhydric compounds which can be reacted include the lower alkanols such as methanol, ethanol, isopropanol, butanol, glycerol, mannitol, pentaerythritol, sorbitol, ethylene glycol, cyclohexanol, etc. The amines generally will be lower amines containing from 1 to about 8 carbon atoms and they may be primary or secondary amines. Examples of such amines include methyl amine, propyl amine, butyl amine, diethyl amine, etc. Hydroxy amines include ethanolamine, diethanolamine, etc. The amount of alkanol or amine reacted with the product obtained by reacting the interpolymer with the aminosulfonic acid can vary over a wide range and will depend in part on the number of unreacted carboxy groups available for reaction with the hydroxy- or amino-containing compounds.

The following examples illustrate the preparation of the N-acylated amino sulfonic acid compositions utilized in the aqueous systems of the invention, but said examples in no way limit the scope of the invention. In these examples, as elsewhere in this specification and in the appended claims, unless otherwise indicated, all parts and percentages are by weight, and molecular weights are number average molecular weights (Mn) as determined by vapor phase osmometry or from saponification number.

EXAMPLE 1

A mixture of 575 parts (0.5 mole) of a polybutenyl succinic anhydride (Mn 1158), 237 parts of diluent oil and 70 parts (0.5 mole) of 2-amino propane sulfonic acid is heated at 200° C. for 20 hours. The reaction mixture is cooled to room temperature, and the desired product is recovered as a solution in diluent oil.

EXAMPLE 2

A reaction mixture comprising 540 parts of polyisobutenyl succinic anhydride (Mn 1100), 87 parts of sulfanilic acid, 500 parts diluent oil, 86 parts of toluene and 95 parts ammonia water (26% ammonia) is slowly heated to 212° C. and maintained at about 210°–240° C. for about 3 hours. The resulting reaction mixture is cooled to room temperature and 50 parts of water, 38 parts methanol and 38 parts of barium oxide are added. This mixture is heated for about 2 hours at 70°–100° C. and is then dried by heating to 160° C. and filtered. The resulting filtrate is the desired oil solution of the barium salt of N-acylated sulfanilic acid.

EXAMPLE 3

A mixture of 550 parts (0.5 mole) of a polyisobutenyl-substituted succinic anhydride (Mn 1100), and 800 parts of xylene is prepared in a reaction flask equipped with stirrer, thermowell, dropping funnel and reflux condenser. The mixture is heated slowly and stirred to dissolve the succinic anhydride. At a temperature of about 54° C., 217.6 parts (0.54 equivalent) of a 33% aqueous solution of the sodium salt of amino methyl sulfonic acid are added dropwise. After a few minutes of addition, the reaction mixture became milky, and 100 parts of tertiary butyl alcohol were added. The amine addition is continued over a period of about 4 hours. The mixture is stirred for an additional 2.5 hours while heating to a temperature of about 45°–46° C. The mixture is allowed to stand at room temperature for 18 days, and an infra-red scan shows no anhydride. Water and xylene are removed by distillation, filter aid is added with stirring, and the mixture is filtered through a filter cloth. The filter pad is washed with 200 parts of xylene, and the combined filtrate are subject to distillation to remove the volatile materials such as xylene and water. The reaction mixture then is contacted with the filter aid, heated to about 130° C. and filtered. The filtrate is the desired product as a 43% xylene solution. The infra-red spectrum indicates imide and sulfonate bands.

EXAMPLE 4

A mixture of 100 parts (0.41 equivalent) of dodecylsuccinic anhydride, 350 parts of xylene and 150 parts of tertiary butyl alcohol is prepared in a reaction vessel equipped with stirrer, reflux condenser, thermowell and dropping funnel. The contents of the reaction vessel are heated to 56° C. with stirring, and 165.3 parts (0.1 equivalent) of a 33% aqueous solution of the sodium salt of amino methyl sulfonic acid are added dropwise. After about 15 minutes, an additional 150 parts of tertiary butyl alcohol are added to reduce the haziness in the reaction vessel. The dropwise addition of the amino sulfonic acid salt is completed in about 66 minutes. Stirring is continued for an additional 30 minutes as the temperature is raised to 61° C. A Dean-Stark trap is attached, and the mixture is heated to reflux for about 8 minutes and thereafter allowed to stand at room temperature for 24 hours whereupon the reaction mixture is separated into two layers. An infra-red spectrum of the upper layer shows no anhydride or acid peaks, only amide and sulfonate peaks. The mixture is stirred and heated slowly to reflux temperature. As the tertiary butyl alcohol is removed in the trap, an equivalent volume of xylene is added to the reaction mixture over a period of about two hours. The mixture is heated at reflux until no more water can be removed. The reaction is cooled and gravity filtered. The filtrate (80% xylene) contains the desired product.

EXAMPLE 5

A mixture of 154 parts (1.25 equivalents) of amino methyl sulfonic acid and 500 parts of water is prepared in a reaction vessel equipped with stirrer, thermowell and reflux condenser. Ammonium hydroxide (85 parts, 1.37 equivalents) is added at room temperature and the reaction mixture is heated to 90° C. over a period of one hour whereupon 1000 parts of oil are added. The mixture is stirred, and 1403 parts (2.5 equivalents) of a polybutene (Mn 1100) substituted succinic anhydride are added in about 0.5 hour at a temperature of 90°–98° C. The mixture is heated to 105° C. and stripped at 105°–100° C. for 3.25 hours and at 110°–183° C. over 2.5 hours. Nitrogen gas is blown through the mixture which is stripped to a temperature of 200° C. over one hour and maintained at this temperature for 9 hours. The mixture is filtered at 150° C. using a filter aid. The filtrate is the desired oil solution of the product.

EXAMPLE 6

A mixture of 483 parts (1.5 moles) of an aqueous mixture (60.3% water) of the ammonium salt of amino methyl sulfonic acid and 378 parts of xylene is prepared in a reaction vessel equipped with heating mantle, thermocouple, gas-inlet tube, trap, condenser and metal stirrer. The mixture is heated to about 70° C. with stirring whereupon 402 parts (1.5 moles) of dodecylsuccinic anhydride are added in 10 minutes. The mixture is stirred for about 1.25 hours at 70°–80° C. and thereafter heated to a temperature of about 90°–95° C. and maintained at this temperature for about 8 hours while stripping volatile materials. The reaction mixture then is cooled to room temperature and filtered. The filtrate is the desired product.

EXAMPLE 7

A mixture of 1460 parts (3.7 moles) of the reaction product of 1 mole of a commercial mixture of $C_{18-24}$ olefins with 1 mole of maleic anhydride, and 1000 parts of xylene is prepared in a reaction vessel equipped with stirrer, thermowell, and stripping condenser. To this mixture there is added 1390 parts (3.7 moles) of the ammonium salt of amino methyl sulfonic acid for maintaining the temperature between 68°–84° C. The mixture then is heated to 95° C. over 0.7 hour, and thereafter to a temperature of 145° C. over a period of 3 hours. The mixture is maintained at 145° C. for 4 hours and filtered. The filtrate is the desired product.

EXAMPLE 8

In this example, the product of Example 7 is converted to a sodium salt. In a reaction vessel equipped with thermocouple, gas-inlet tube, trap, condenser and metal stirrer, there is added 800 parts of the product of Example 7. While stirring the mixture, 67.37 parts of a 50% aqueous solution of sodium hydroxide are added in 20 minutes. The reaction is exothermic to a temperature of about 40° C., and 20 parts of water is added to the reaction mixture. The mixture then is heated to about 60° C. and maintained at this temperature for one hour followed by the addition of 1800 parts of water. Xylene is stripped from the reaction mixture over a period of about 10 hours while the reaction temperature is maintained at between about room temperature and 80° C. The mixture is cooled to room temperature, and 235 parts of an isobutyl-amyl alcohol mixture are added to form a clear, dark-amber solution of the desired product. The solution is 71% water and 8.9% alcohol.

EXAMPLE 9

A mixture of 280 parts (0.79 mole) of the sodium salt of amino methyl sulfonic acid and 600 parts of diluent oil is charged to a reaction vessel equipped with stirrer, thermowell, and stripping condenser. To this mixture there is added with stirring, 832 parts (1.5 equivalents) of polyisobutene succinic anhydride per molecular weight (about 1100) in about 5 minutes at a temperature of 78°–85° C. The mixture then is heated to 105° C. over 0.5 hour and volatile materials are stripped to a temperature of 180° C. over 4 hours. The mixture is maintained at 180°–200° C. for an additional 3.25 hours and allowed to stand. The mixture is filtered at 145° C. using 100 parts of a filter aid. The filtrate is the desired product containing 39.3% oil, 1.33% nitrogen, and 1.37% sulfur.

EXAMPLE 10

A mixture of 61.5 parts (0.5 equivalent) of amino methyl sulfonic acid and 200 parts of water is prepared in a reaction vessel equipped with stirrer, thermowell, nitrogen-inlet tube below surface, and stripping condenser. To this mixture there is added 34 parts (0.55 equivalent) of ammonium hydroxide at room temperature followed by heating to 85° C. whereupon 400 parts of a diluent oil are added. After heating an additional 15 minutes at 95° C., 561 parts (1.0 equivalent) of polyisobutenyl succinic anhydride are added in 2 minutes. The reaction mixture then is stripped to 125° C. over 2.5 hours, to 150° C. over 1.5 hours, and to 190° C. for an additional hour. The mixture is maintained at 190°-205° C. for about 5 hours, and after cooling to 145° C. is filtered using a filter aid. The filtrate is the desired product containing 38.8% diluent oil, 1.11% nitrogen, and 1.07% sulfur.

EXAMPLE 11

In a glass jar equipped with metal stirrer, there is added 200 parts of the product prepared in accordance with Example 7, and 19.04 parts of a 50% aqueous sodium hydroxide solution are added dropwise over a period of 10 minutes. The reaction is exothermic and ammonia is evolved. The mixture is stirred an additional 10 minutes and transferred to a large evaporating dish. The dish is placed in an oven at about 60° C. for 6 hours to evaporate all of the volatile materials leaving an amber-brown semi-solid which is the desired sodium salt.

EXAMPLE 12

A mixture of 88.2 parts (0.9 mole) of maleic anhydride and 100 parts of water is prepared in a reaction vessel equipped with heating mantle, thermocouple, gas-inlet tube, trap, condenser and stirrer. The mixture is stirred with heating to a temperature of 46° C. whereupon a clear solution is obtained. An aqueous solution (60.3% water) of the ammonium salt of amino methyl sulfonic acid (290 parts, 0.9 mole) is added dropwise in 0.5 hour or maintained at a temperature of between 45° and 50° C. The mixture is heated to 90° C. in 1.5 hours, and water is removed from the reaction mixture for a period of about 6 hours. The mixture then is cooled to room temperature, and an orange-red solution is obtained as the desired product.

The invention includes aqueous systems or compositions characterized by an aqueous phase with the amino sulfonic acids of the invention dispersed in said aqueous phase. Preferably, this aqueous phase is a continuous aqueous phase. These aqueous systems usually contain at least about 40% by weight water. Such aqueous systems encompass both concentrates containing about 40% to about 70%, preferably about 40% to about 65% water; and water-based functional fluids containing at least 40% and generally over 70% of water and a minor thickening or emulsifying amount of the amino sulfonic acids of the invention, preferably from about 1.5% to about 10%, more preferably about 3% to about 6% by weight of said amino sulfonic acids. The concentrates generally contain less than about 50%, preferably less than about 25%, more preferably less than about 15%, and still more preferably less than about 6% hydrocarbyl oil. The water-based functional fluids contain less than about 15%, preferably less than about 5%, and more preferably less than about 2% hydrocarbyl oil.

These concentrates and water-based aqueous systems can optionally include other conventional additives commonly employed in water-based functional fluids. These other additives include dispersant/solubilizers, surfactants, functional additives, corrosion-inhibitors, shear stabilizing agents, bactericides, dyes, water-softeners, odor masking agents, anti-foam agents, and the like.

The concentrates are analogous to the water-based functional fluids except that they contain less water and proportionately more of the other ingredients. The concentrates can be converted to water-based functional fluids by dilution with water. This dilution is usually done by standard mixing techniques. This is often a convenient procedure since the concentrate can be shipped to the point of use before additional water is added. Thus, the cost of shipping a substantial amount of the water in the final water-based functional fluid is saved. Only the water necessary to formulate the concentrate (which is determined primarily by ease of handling and convenience factors), need be shipped.

Generally these water-based functional fluids are made by diluting the concentrates with water, wherein the ratio of water to concentrate is usually in the range of about 80:20 to about 99:1 by weight. As can be seen when dilution is carried out within these ranges, the final water-based functional fluid contains, at most, an insignificant amount of hydrocarbyl oil.

Also included within the invention are methods for preparing aqueous systems, including both concentrates and water-based functional fluids, containing other conventional additives commonly employed in water-based functional fluids. These methods comprise the steps of:

(1) mixing the composition of the invention with such other conventional additives either simultaneously or sequentially to form a dispersion or solution; optionally (2) combining said dispersion or solution with water to form said aqueous concentrate; and/or (3) diluting said dispersion or solution, or concentrate with water wherein the total amount of water used is in the amount required to provide the desired concentration of the composition of the invention and other functional additives in said concentrates or said water-based functional fluids.

These mixing steps are carried out using conventional equipment and generally at room or slightly elevated temperatures, usually below 100° C. and often below 50° C. As noted above, the concentrate can be formed and then shipped to the point of use where it is diluted with water to form the desired water-based functional fluid. In other instances the finished water-based functional fluid can be formed directly in the same equipment used to form the concentrate or the dispersion or solution.

The dispersant/solubilizers that are useful in accordance with the present invention include the nitrogen-containing, phosphorus-free carboxylic solubilizers disclosed in U.S. Pat. Nos. 4,329,249; 4,368,133; 4,435,297; 4,447,348; and 4,448,703. These patents are incorporated herein by reference. Briefly, these dispersant/solubilizers are made by reacting (I) at least one carboxylic acid acylating agent having at least one hydrocarbyl-based substituent of at least about 12 to about 500 carbon atoms with (II) at least one (a) N-(hydroxyl-substituted hydrocarbyl) amine, (b) hydroxyl-substituted poly(hydrocarbyloxy) analog of said amine (a), or (c)

mixtures of (a) and (b). Preferred acylating agents include the substituted succinic acids or anhydrides. Preferred amines include the primary, secondary and tertiary alkanol amines or mixtures thereof. These dispersant/solubilizers are preferably used at effective levels to disperse or dissolve the various additives, particularly the functional additives discussed below, in the concentrates and/or water-based functional fluids of the present invention. In a particularly preferred embodiment of the present invention, the dispersant/solubilizer is the reaction product of a polyisobutenyl-substituted succinic anhydride with diethylenethanolamine or a mixture of diethylenethanolamine and ethanolamine.

The surfactants that are useful can be of the cationic, anionic, nonionic or amphoteric type. Many such surfactants of each type are known to the art. See, for example, McCutcheon's "Emulsifiers & Detergents", 1981, North American Edition, published by McCutcheon Division, MC Publishing Co., Glen Rock, N.J., U.S.A., which is hereby incorporated by reference for its disclosure in this regard.

Among the nonionic surfactant types are the alkylene oxide-treated products, such as ethylene oxide-treated phenols, alcohols, esters, amines and amides. Ethylene oxide/propylene oxide block copolymers are also useful nonionic surfactants. Glycerol esters and sugar esters are also known to be nonionic surfactants. A typical nonionic surfactant class useful with the present invention are the alkylene oxide-treated alkyl phenols such as the ethylene oxide alkyl phenol condensates sold by the Rohm & Haas Company. A specific example of these is Triton X-100 which contains an average of 9-10 ethylene oxide units per molecule, has an HLB value of about 13.5 and a molecular weight of about 628. Many other suitable nonionic surfactants are known; see, for example, the aforementioned McCutcheon's as well as the treatise "Non-Ionic Surfactants" edited by Martin J. Schick, M. Dekker Co., New York, 1967, which is hereby incorporated by reference for its disclosures in this regard.

As noted above, cationic, anionic and amphoteric surfactants can also be used. Generally, these are all hydrophilic surfactants. Anionic surfactants contain negatively charged polar groups while cationic surfactants contain positively charged polar groups. Amphoteric dispersants contain both types of polar groups in the same molecule. A general survey of useful surfactants is found in Kirk-Othmer Encyclopedia of Chemical Technology, Second Edition, Volume 19, page 507 et seq. (1969, John Wiley and Son, New York) and the aforementioned compilation published under the name of McCutcheon's. These references are both hereby incorporated by reference for their disclosures relating to cationic, amphoteric and anionic surfactants.

Among the useful anionic surfactant types are the widely known carboxylate soaps, organo sulfates, sulfonates, sulfocarboxylic acids and their salts, and phosphates. Useful cationic surfactants include nitrogen compounds such as amine oxides and the well-known quaternary ammonium salts. Amphoteric surfactants include amino acid-type materials and similar types. Various cationic, anionic and amphoteric dispersants are available from the industry, particularly from such companies as Rohm & Haas and Union Carbide Corporation, both of America. Further information about anionic and cationic surfactants also can be found in the texts "Anionic Surfactants", Parts II and III, edited by W. M. Linfield, published by Marcel Dekker, Inc., New York, 1976 and "Cationic Surfactants", edited by E. Jungermann, Marcel Dekker, Inc., New York, 1976. Both of these references are incorporated by reference for their disclosures in this regard.

These surfactants, when used, are generally employed in effective amounts to aid in the dispersal of the various additives, particularly the functional additives discussed below, in such systems.

The functional additives that can be used are typically oil-soluble, water-insoluble additives which function in conventional oil-based systems as E.P. agents, anti-wear agents, load-carrying agents, friction modifiers, lubricity agents, etc. They can also function as anti-slip agents, film formers and friction modifiers. As is well known, such additives can function in two or more of the above-mentioned ways; for example, E.P. agents often function as load-carrying agents.

The term "oil-soluble, water-insoluble functional additive" refers to a functional additive which is not soluble in water above a level of about 1 gram per 100 milliliters of water at 25°, but is soluble in mineral oil to the extent of at least 1 gram per liter at 25°.

These functional additives can also include certain solid lubricants such as graphite, molybdenum disulfide and polytetrafluoroethylene and related solid polymers.

These functional additives can also include frictional polymer formers. Briefly, these are potential polymer forming materials which are dispersed in a liquid carrier at low concentration and which polymerize at rubbing or contacting surfaces to form protective polymeric films on the surfaces. The polymerizations are believed to result from the heat generated by the rubbing and, possibly, from catalytic and/or chemical action of the freshly exposed surface. A specific example of such materials is dilinoleic acid and ethylene glycol combinations which can form a polyester frictional polymer film. These materials are known to the art and descriptions of them are found, for example, in the journal "Wear", Volume 26, pages 369–392, and West German Published Patent Application No. 2,339,065. These disclosures are hereby incorporated by reference for their discussions of frictional polymer formers.

Typically these functional additives are known metal or amine salts of organo sulfur, phosphorus, boron or carboxylic acids which are the same as or of the same type as used in oil-based fluids. Typically such salts are of carboxylic acids of 1 to 22 carbon atoms including both aromatic and aliphatic acids; sulfur acids such as alkyl and aromatic sulfonic acids and the like; phosphorus acids such as phosphoric acid, phosphorus acid, phosphinic acid, acid phosphate esters and analogous sulfur homologs such as the thiophosphoric and dithiophosphoric acid and related acid esters; boron acids include boric acid, acid borates and the like. Useful functional additives also include metal dithiocarbamates such as molybdenum and antimony dithiocarbamates; as well as dibutyl tin sulfide, tibutyl tin oxide, phosphates and phosphites; borate amine salts, chlorinated waxes; trialkyl tin oxide, molybdenum phosphates, and chlorinated waxes.

Mainly such functional additives are known to the art. For example, descriptions of additives useful in conventional oil-based systems and in the aqueous systems of this invention are found in "Advances in Petroleum Chemistry and Refining", Volume 8, edited by John J. McKetta, Interscience Publishers, New York, 1963, pages 31–38 inclusive; Kirk-Othmer "Encyclopedia of Chemical Technology", Volume 12, Second Edition, Interscience Publishers, New York, 1967, page 575 et seq.; "Lubricant Additives" by M. W. Ranney, Noyes Data Corporation, Park Ridge, N.J., U.S.A., 1973; and "Lubricant Additives" by C. V. Smalheer and R. K. Smith, The Lezius-Hiles Co., Cleveland, Ohio, U.S.A. These references are hereby incorporated by reference for their disclosures of functional additives useful in the systems of this invention.

In certain of the typical aqueous systems of the invention, the functional additive is a sulfur or chloro-sulfur E.P. agent, known to be useful in oil-base systems. Such materials include chlorinated aliphatic hydrocarbons, such as chlorinated wax; organic sulfides and polysulfides, such as benzyldisulfide, bis-(chlorobenzyl)disulfide, dibutyl tetrasulfide, sulfurized sperm oil, sulfurized methyl ester of oleic acid, sulfurized alkylphenol, sulfurized dipentane, sulfurized terpene, and sulfurized Diels-Alder adducts; phosphosulfurized hydrocarbons, such as the reaction product of phosphorus sulfide with turpentine or methyl oleate; phosphorus esters such as the dihydrocarbon and trihydrocarbon phosphites, i.e., dibutyl phosphite, diheptyl phosphite, dicyclohexyl phosphite, pentylphenyl phosphite, dipentylphenyl phosphite, tridecyl phosphite, distearyl phosphite and polypropylene substituted phenol phosphite; metal thiocarbamates, such as zinc dioctyldithiocarbamate and barium heptylphenol dithiocarbamate; and Group II metal salts of phosphorodithioc acid, such as zinc dicyclohexyl phosphorodithioate, and the zinc salts of a phosphorodithioc acid.

The functional additive can also be a film former such as a synthetic or natural latex or emulsion thereof in water. Such latexes include natural rubber latexes and polystyrene butadienes synthetic latex.

The functional additive can also be an anti-chatter or anti-squawk agent. Examples of the former are the amide metal dithiophosphate combinations such as disclosed in West German Patent No. 1,109,302; amine salt-azomethene combinations such as disclosed in British Patent Specification No. 893,977; or amine dithiophosphate such as disclosed in U.S. Pat. No. 3,002,014. Examples of anti-squawk agents are N-acyl-sarcosines and derivatives thereof such as disclosed in U.S. Pat. Nos. 3,156,652 and 3,156,653; sulfurized fatty acids and esters thereof such as disclosed in U.S. Pat. Nos. 2,913,415 and 2,982,734; and esters of dimerized fatty acids such as disclosed in U.S. Pat. No. 3,039,967. The above-cited patents are incorporated herein by reference for their disclosure as pertinent to anti-chatter and anti-squawk agents useful as a functional additive in the aqueous systems of the present invention.

Specific examples of functional additives useful in the aqueous systems of this invention include the following commercially available products.

TABLE I

| Functional Additive Trademark | Chemical Description | Supplier |
|---|---|---|
| Anglamol 32 | Chlorosulfurized hydrocarbon | Lubrizol[1] |
| Anglamol 75 | Zinc dialkyl phosphate | Lubrizol[1] |
| Molyvan L | A thiaphosphomolybdate | Vanderbilt[2] |
| Lubrizol-5315 | Sulfurized cyclic carboxylate ester | Lubrizol[1] |
| Emcol TS 230 | Acid phosphate | Witco[3] |

TABLE I-continued

| Functional Additive Trademark | Chemical Description | Supplier |
|---|---|---|
|  | ester |  |

[1]The Lubrizol Corporation, Wickliffe, Ohio, U.S.A.
[2]R. T. Vanderbilt Company, Inc., New York, N.Y., U.S.A.
[3]Witco Chemical Corp., Organics Division, Houston, Texas, U.S.A.

Mixtures of two or more of any of the afore-described functional additives can also be used.

Typically, a functionally effective amount of the functional additive is present in the aqueous systems of this invention. For example, if the functional additive is intended to serve primarily as a load-carrying agent, it is present in a load-carrying amount.

The aqueous systems of this invention often contain at least one inhibitor for corrosion of metals. These inhibitors can prevent corrosion of either ferrous or non-ferrous metals (e.g., copper, bronze, brass, titanium, aluminum and the like) or both. The inhibitor can be organic or inorganic in nature. Usually it is sufficiently soluble in water to provide a satisfactory inhibiting action though it can function as a corrosion-inhibitor without dissolving in water, it need not be water-soluble. Many suitable inorganic inhibitors useful in the aqueous systems of the present invention are known to those skilled in the art. Included are those described in "Protective Coatings for Metals" by Burns and Bradley, Reinhold Publishing Corporation, Second Edition, Chapter 13, pages 596–605. This disclosure relative to inhibitors are hereby incorporated by reference. Specific examples of useful inorganic inhibitors include alkali metal nitrides, sodium di- and tripolyphosphate, potassium and dipotassium phosphate, alkali metal borate and mixtures of the same. Many suitable organic inhibitors are known to those of skill in the art. Specific examples include hydrocarbyl amine and hydroxy-substituted hydrocarbyl amine neutralized acid compound, such as neutralized phosphates and hydrocarbyl phosphate esters, neutralized fatty acids (e.g., those having about 8 to about 22 carbon atoms), neutralized aromatic carboxylic acids (e.g., 4-tertiarybutyl benzoic acid), neutralized naphthenic acids and neutralized hydrocarbyl sulfonates. Mixed salt esters of alkylated succinimides are also useful. Particularly useful amines include the alkanol amines such as ethanol amine, diethanol amine. Mixtures of two or more of any of the afore-described corrosion-inhibitors can also be used. The corrosion-inhibitor is usually present in concentrations in which they are effective in inhibiting corrosion of metals with which the aqueous composition comes in contact.

Certain of the aqueous systems of the present invention (particularly those that are used in cutting or shaping of metal) can also contain at least one polyol with inverse solubility in water. Such polyols are those that become less soluble as the temperature of the water increases. They thus can function as surface lubricity agents during cutting or working operation since, as the liquid is heated as a result of friction between a metal workpiece and worktool, the polyol of inverse solubility "plates out" on the surface of the workpiece, thus improving its lubricity characteristics.

The aqueous systems of the present invention can also include at least one bacteriocide. Such bacteriocides are well known to those of skill in the art and specific examples can be found in the aforementioned McCutcheon publication "Functional Materials" under the heading "Antimicrobials" on pages 9–20 thereof. This disclosure is hereby incorporated by reference as it relates to suitable bacteriocides for use in the aqueous compositions or systems of this invention. Generally, these bacteriocides are water-soluble, at least to the extent to allow them to function as bacteriocides.

The aqueous systems of the present invention can also include such other materials as dyes, e.g., an acid green dye; water softeners, e.g., ethylene diamine tetraacetate sodium salt or nitrilo triacetic acid; odor masking agents, e.g., citronella, oil of lemon, and the like; and anti-foamants, such as the well-known silicone anti-foamant agents.

The aqueous systems of this invention may also include an anti-freeze additive where it is desired to use the composition at a low temperature. Materials such as ethylene glycol and analogous polyoxyalkylene polyols can be used as anti-freeze agents. Clearly, the amount used will depend on the degree of anti-freeze protection desired and will be known to those of ordinary skill in the art.

It should also be noted that many of the ingredients described above for use in making the aqueous systems of this invention are industrial products which exhibit or confer more than one property on such aqueous systems. Thus, a single ingredient can provide several functions thereby eliminating or reducing the need for some other additional ingredient. Thus, for example, an E.P. agent such as tributyl tin oxide can also function as a bactericide.

I claim:

1. An aqueous system comprising:
at least about 70% by weight of water based on the weight of the aqueous system; and
about 3% to about 6% by weight based on the weight of the aqueous system of an imido hydrocarbyl sulfonic acid or salt thereof obtained by reacting a hydrocarbyl substituted succinic acid or anhydride with an amino hydrocarbyl sulfonic acid or salt thereof having the formula

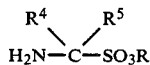

wherein $R^4$ and $R^5$ are each independently hydrogen, alkyl or aromatic and R is hydrogen or a cation.

2. The aqueous system of claim 1 wherein $R^4$ and $R^5$ are independently methyl or hydrogen and R is a cation of a metal, ammonia or an amine.

3. The aqueous system as claimed in claim 2 wherein the amino hydrocarbyl sulfonic acid or salt thereof is amino methyl sulfonic acid or sodium salt thereof.

4. The aqueous system of claim 1 wherein the hydrocarbyl substituent is a polymer obtained by the polymerization of mono-olefins having 2–30 carbon atoms.

5. The aqueous system of claim 4 wherein the polymer has a molecular weight in the range of 400–5,000.

6. The aqueous system of claim 1 wherein the hydrocarbyl substituted succinic acid or anhydride is a polybutenyl or polyisobutenyl-substituted succinic anhydride.

7. The aqueous system of claim 6 wherein $R^4$ and $R^5$ are independently methyl or hydrogen and R is a cation of a metal, ammonia or an amine.

8. The aqueous system of claim 7 wherein the amino hydrocarbyl sulfonic acid or salt thereof is amino methyl sulfonic acid or ammonia salt thereof.

* * * * *